United States Patent [19]

Conrad

[11] 4,055,620
[45] Oct. 25, 1977

[54] FLEXIBLE MOLD AND PROCESS

[76] Inventor: Jack R. Conrad, 3071 Club House Circle, Costa Mesa, Calif. 92626

[21] Appl. No.: 721,038

[22] Filed: Sept. 7, 1976

[51] Int. Cl.² .......................... B29C 5/00; B29C 7/00; B29D 23/00
[52] U.S. Cl. .................................. 264/313; 264/335; 425/DIG. 44
[58] Field of Search ................. 264/334, 92, 275, 313, 264/335; 425/DIG. 44

[56] References Cited

U.S. PATENT DOCUMENTS

| | | | |
|---|---|---|---|
| 3,353,220 | 11/1967 | Lenoble | 264/275 |
| 3,355,534 | 11/1967 | Groff | 264/275 |
| 3,390,881 | 7/1967 | Senne | 264/275 |
| 3,705,248 | 12/1972 | Hill et al. | 264/334 |
| 3,755,522 | 8/1973 | Jope et al. | 264/92 |
| 3,998,422 | 12/1976 | Putzer | 264/334 |

Primary Examiner—Willard E. Hoag
Attorney, Agent, or Firm—Keith D. Beecher

[57] ABSTRACT

A flexible mold and process is provided for making pots, and the like, the mold comprising a cylindrical-shaped rubber-like resilient member having an annular-shaped cavity contained therein, and an open top. The construction of the mold is such the pressurized air may be introduced into the cavity to move the outer peripheral portion of the mold radially outwardly to release the part being molded. A nail, or similar article may be inserted into the central part of the mold to protrude through the open top of the mold along the central axis thereof. The nail causes a hole to be formed in the bottom of the article being molded which serves as a water hole when flower pots, for example, are being molded, and which also provides a convenient hole through which the releasing pressurized air may be introduced into the mold cavity.

2 Claims, 3 Drawing Figures

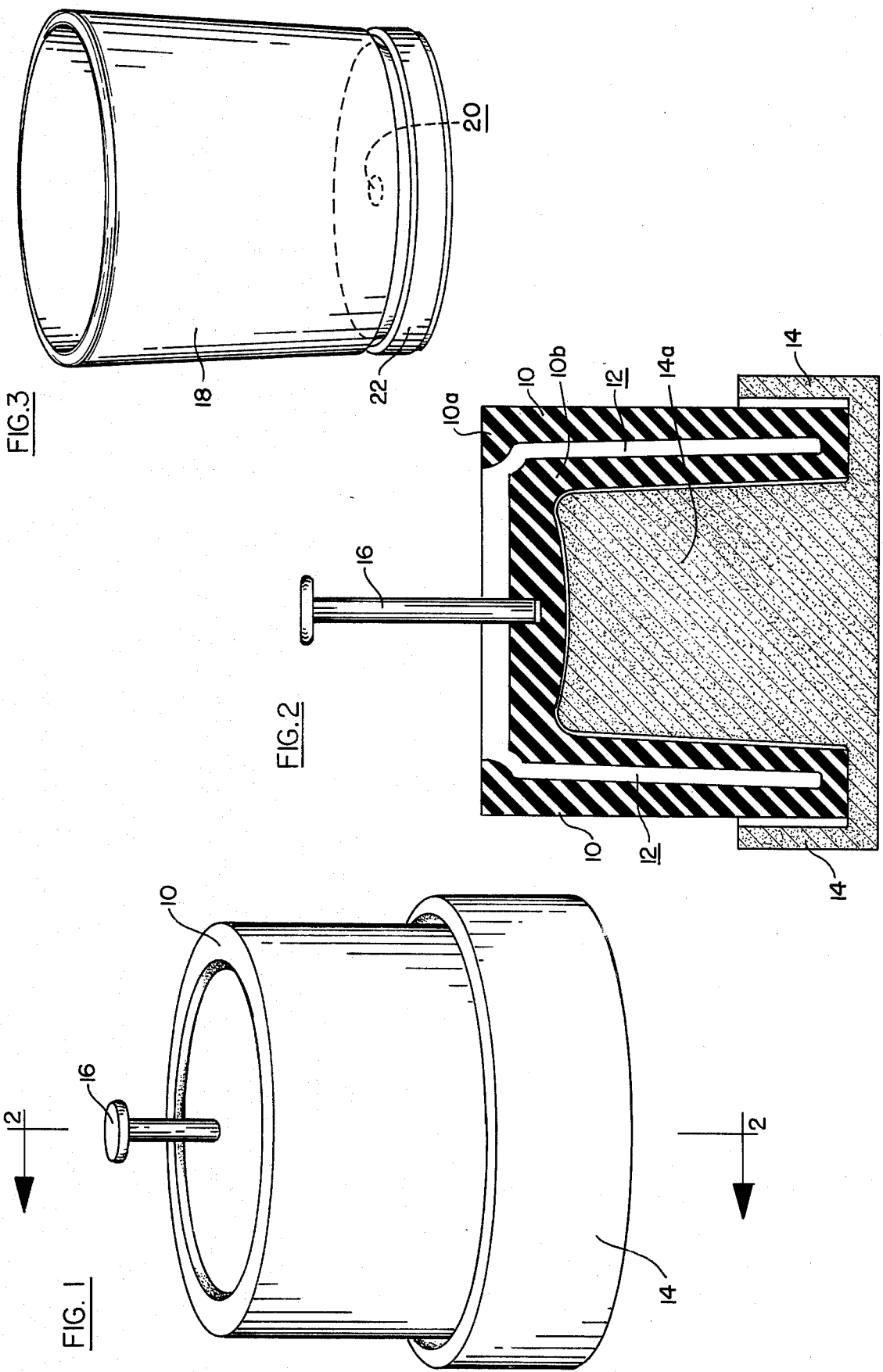

FLEXIBLE MOLD AND PROCESS

BACKGROUND OF THE INVENTION

The flexible mold of the present invention represents an improved mold for molding pots, or other articles, from a resin, or other appropriate casting material. The flexible mold of the invention is of integral construction so that there is no leakage from the cavity. Also, there are no mold lines on the molded workpiece as a result of the molding operation. The use of the mold of the invention makes the molding process eminently simple, because no release spray is required, the molded article being released by a simple blow-out of the mold after the workpiece has set. No finishing operations are required on the part, and when the article has been released from the mold, except to sand the bottom of the part. It is then merely necessary to pack and ship it.

BRIEF DESCRIPTION OF THE DRAWINGS

FIG. 1 is a perspective view of a flexible mold constructed in accordance with one embodiment of the invention, and held in an appropriate retaining case;

FIG. 2 is a longitudinal section of the mold and case of FIG. 1, taken essentially along the line 2—2 of FIG. 1; and FIG. 3 is a perspective view of a molded article, such as a flower pot, that may be molded by the flexible mold of FIGS. 1 and 2.

DETAILED DESCRIPTION OF THE ILLUSTRATED EMBODIMENT

The flexible mold of the invention, in the illustrated embodiment, is designated 10. The mold may be formed, for example, of any appropriate rubber-like material, such as General Electric RTV664, or its equivalent. The mold 10 has a generally cylindrical configuration, and it defines an internal cavity 12 so that the mold is essentially separated into an outer cylindrical portion 10A, and an inner cylindrical portion 10B.

The mold 10 is supported in a case 14 which may be formed of plastic, water extended polyester, or any other suitable plaster-like, or other material. The case 14 has the configuration shown in FIGS. 1 and 2, and has a central portion 14A which extends up into the central portion 10B of the flexible mold as a suitable retainer.

A nail, or other elongated member 16 extends through the open top of the mold 10, and the nail is supported in an appropriate cavity in the top of the central portion 10B.

In carrying out the process of the invention, an appropriate casting resin, or other suitable material is poured into the cavity 12 until it fills the cavity and extends over the top of the inner portion 10B of the mold and fills the open top of the mold to be flush with the top surface of the outer portion 10A. The casting material is then permitted to set and harden, and the nail 16 is removed.

The article being molded may have the configuration shown by the flower pot 18 of FIG. 3, the flower pot having a hole 20 in its bottom, formed by the nail 16. The flower pot 18 is supported in an inverted position in the mold of FIGS. 1 and 2. To release the pot, pressurized air is introduced through the hole 20 and into the cavity 12, and this air forces the outer portion 10A of the mold in a radially outward direction, so that the pot 18, or other molded article, may be removed. In use the pot 18 may be supported on an appropriate base 22.

As mentioned above, the molded article 18 may be removed from the mold in the foregoing manner without the need for a release spray or the like. Also, when the article has been removed, there are no mold lines, and no finishing operations (apart from sanding the bottom surface) and necessary. Also, since the cavity 12 is completely surrounded by the flexible mold, there are no leakage problems.

It is possible to introduce the air into the cavity 12 through the open top of the mold, and between the outer peripheral surface of the molded article and the inner surface of the outer portion 10B of the mold. However, it has been found in practice that more efficient operation can be achieved by introducing the air through the hole 20 in the molded article.

The case 14 is part of the system, since it restricts the deformation of the flexible mold, and forces the article being molded out through the open top of the mold. It has been found that smaller molds do not require the case 14, however, the larger molds require the restrictive force provided by the case.

The invention provides, therefore, a simple and inexpensive flexible mold and molding system and process, by which articles, such as flower pots, and the like, can be produced on a mass production basis in a simple and expeditious manner.

It will be appreciated that although a particular embodiment of the invention has been shown and described, modifications may be made. It is intended in the claims to cover the modifications which come within the spirit and scope of the invention.

What is claimed is:

1. In a method of making a substantially cylindrical article having an open end and a closed end, said closed end having an aperture therein, the steps comprising:

supporting an expansible mold having radially spaced inner and outer walls defining an annular cavity therebetween, said annular cavity being closed at one end and open at another end thereof, said mold also having an upper mold surface extending between end portions of said inner wall; inserting an elongated member through the open end of said cavity and into the upper mold surface;

filling said cavity with a hardenable casting material; permitting said casting material to harden to form the substantially cylindrical article having an open end and a cosed end; removing said elongated member to form an aperture in the closed end; and introducing pressurized fluid into the mold through said aperture and causing said outer wall to move radially outwardly releasing said article and removing said article from said mold through said open end of said cavity.

2. The method of claim 1 wherein said supporting step includes supporting portions of said mold defining said upper mold surface and said radially inner wall against a case member, said annular cavity extending upwardly, while leaving portions of said outer wall free to move radially outwardly.

* * * * *